United States Patent
Tajima et al.

(10) Patent No.: US 11,029,651 B2
(45) Date of Patent: Jun. 8, 2021

(54) MACHINE LEARNING DEVICE, CONTROL SYSTEM, CONTROL DEVICE, AND MACHINE LEARNING METHOD

(71) Applicant: FANUC CORPORATION, Yamanashi (JP)

(72) Inventors: Daisuke Tajima, Yamanashi (JP); Yuuki Morita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 72 days.

(21) Appl. No.: 16/101,968

(22) Filed: Aug. 13, 2018

(65) Prior Publication Data
US 2019/0064756 A1 Feb. 28, 2019

(30) Foreign Application Priority Data
Aug. 29, 2017 (JP) .............................. JP2017-164062

(51) Int. Cl.
*G01L 5/24* (2006.01)
*G05B 13/04* (2006.01)
(Continued)

(52) U.S. Cl.
CPC .............. *G05B 13/041* (2013.01); *G01L 5/24* (2013.01); *G05B 19/186* (2013.01);
(Continued)

(58) Field of Classification Search
CPC .................................................... G05B 13/041
See application file for complete search history.

(56) References Cited

U.S. PATENT DOCUMENTS 4,692,071 A * 9/1987 Hirota ...................... B23G 1/20
318/39
6,345,205 B1 2/2002 Inamasu et al.
(Continued)

FOREIGN PATENT DOCUMENTS

CN 1647881 8/2005
CN 103941636 7/2014
(Continued)

OTHER PUBLICATIONS

Office Action dated Dec. 4, 2019 in Chinese Patent Application No. 201810962799.0.
(Continued)

*Primary Examiner* — Jennifer L Norton
(74) *Attorney, Agent, or Firm* — Wenderoth, Lind & Ponack, L.L.P.

(57) ABSTRACT

A machine learning device includes: a state information acquisition unit configured to cause the control device to execute a tapping program to acquire from the control device, state information including a torque command value with respect to the spindle motor, a drive state including deceleration, a ratio of a movement distance in acceleration and a movement distance in deceleration; an action information output unit configured to output action information including adjustment information of the ratio of the movement distance in acceleration and the movement distance in deceleration, to the control device; a reward output unit configured to output a reward value in reinforcement learning based on a torque command value in deceleration, and a target torque command value in deceleration; and a value function update unit configured to update an action value function based on the reward value, the state information, and the action information.

8 Claims, 8 Drawing Sheets

(51) Int. Cl.
   *G05B 19/18*      (2006.01)
   *G06N 20/00*      (2019.01)
   *G06N 3/08*       (2006.01)
   *G05B 19/416*     (2006.01)
   *G06N 3/00*       (2006.01)

(52) U.S. Cl.
   CPC ........... *G05B 19/416* (2013.01); *G06N 3/006*
        (2013.01); *G06N 3/08* (2013.01); *G06N 20/00*
               (2019.01); *G05B 2219/45216* (2013.01)

(56) References Cited

U.S. PATENT DOCUMENTS

| | | | |
|---|---|---|---|
| 2001/0013267 | A1 | 8/2001 | Endo et al. |
| 2008/0168016 | A1* | 7/2008 | Sekiai ................... G06N 20/00 |
| | | | 706/46 |
| 2013/0039707 | A1* | 2/2013 | Takayama ............ G05B 19/416 |
| | | | 408/9 |
| 2015/0081084 | A1 | 3/2015 | Nishiwaki et al. |
| 2015/0205282 | A1* | 7/2015 | Tezuka ................. G05B 19/182 |
| | | | 700/160 |
| 2016/0116909 | A1* | 4/2016 | Morita ................. G05B 19/186 |
| | | | 700/188 |
| 2016/0291580 | A1* | 10/2016 | Morita ................. B23Q 15/007 |
| 2019/0227502 | A1* | 7/2019 | Nakamura ............. G06N 20/00 |
| 2020/0166910 | A1* | 5/2020 | Uchida ................. G06N 20/00 |
| 2020/0342356 | A1* | 10/2020 | Bao ..................... G05B 19/406 |

FOREIGN PATENT DOCUMENTS

| | | |
|---|---|---|
| CN | 104380218 | 2/2015 |
| CN | 105527928 | 4/2016 |
| CN | 107073612 | 8/2017 |
| DE | 10 2016 008 995 | 2/2017 |
| DE | 10 2016 010 064 | 4/2017 |
| JP | 2004-202594 | 7/2004 |
| JP | 2017-30061 | 2/2017 |

OTHER PUBLICATIONS

Office Action dated Apr. 28, 2020 in corresponding German Patent Application No. 102018214276.9.

* cited by examiner

MACHINE LEARNING DEVICE, CONTROL SYSTEM, CONTROL DEVICE, AND MACHINE LEARNING METHOD

This application is based on and claims the benefit of priority from Japanese Patent Application No. 2017-164062, filed on 29 Aug. 2017, the content of which is incorporated herein by reference.

BACKGROUND OF THE INVENTION

Field of the Invention

The present invention relates to: a machine learning device that performs machine learning with respect to a control device of a machine tool, the control device controlling synchronous operation of a spindle motor and a feed axis motor; a control system; a control device; and a machine learning method.

Related Art

A conventional control device of a machine tool, that performs tapping (screw hole drilling) with respect to a workpiece by synchronous operation of a spindle motor and a feed axis motor, is known. For example, Patent Document 1 discloses a control device of a machine tool, capable of reducing cycle time by performing control for causing a spindle motor to exert maximum acceleration ability. Specifically, this control device includes a spindle control unit that drives a spindle motor. The spindle control unit includes: an initial operation control unit that causes the spindle to acceleration rotate at the maximum ability from a machining start position with the maximum rotation speed V0 as a target value; a maximum acceleration detection unit that detects the maximum acceleration AO of the spindle during the acceleration rotation; a remained rotation amount detection unit that detects a remained rotation amount Sr of the spindle from a current position to a target screw depth; a current speed detection unit that detects a current speed Vc of the spindle; a positioning operation control unit that causes the spindle to deceleration rotate after the acceleration rotation so that the spindle reach the target screw depth; and an excessive detection unit that detects an excessive amount Ov of the spindle with respect to the target screw depth during the deceleration rotation.

Patent Document 1: Japanese Unexamined Patent Application, Publication No. 2017-30061

SUMMARY OF THE INVENTION

For tapping with respect to a workpiece by synchronous operation of a spindle motor and a feed axis motor, a drive state for rotating a tool is in an order of acceleration, constant speed, deceleration, and stop. Here, when a spindle torque command value in deceleration is increased so that a deceleration period is reduced, and a constant speed period is extended, a cycle time can be reduced. However, when the spindle torque command value in deceleration is excessively increased, sometimes the spindle torque command value exceeds the target spindle torque command value in deceleration.

An object of the present invention is to provide: a machine learning device; a control system; a control device; and a machine learning method, capable of, while approximating a motor ability in deceleration to a target value, stabilizing for each machine or each operation condition, with respect to a machining program.

(1) A machine learning device (for example, a machine learning device 300 described later) according to the present invention performs machine learning with respect to a control device (for example, a control device 200 described later) of a machine tool (for example, a machine tool 100 described later), the control device controlling synchronous operation of a spindle motor (for example, a spindle motor 101 described later) and a feed axis motor (for example, a feed axis motor 105 described later), the machine learning device including: a state information acquisition unit (for example, a state information acquisition unit 301 described later) configured to cause the control device to execute a tapping program to acquire from the control device, state information including at least a torque command value with respect to the spindle motor, a drive state including deceleration of the spindle motor, and a ratio of a movement distance in acceleration and a movement distance in deceleration of the spindle motor;

an action information output unit (for example, an action information output unit 303 described later) configured to output action information including adjustment information of the ratio of the movement distance in acceleration and the movement distance in deceleration of the spindle motor included in the state information, to the control device;

a reward output unit (for example, a reward output unit 3021 described later) configured to output a reward value in reinforcement learning based on a torque command value in deceleration included in the state information, and a target torque command value in deceleration; and a value function update unit (for example, a value function update unit 3022 described later) configured to update an action value function based on the reward value output from the reward output unit, the state information, and the action information.

(2) In the machine learning device according to (1) described above, the reward output unit may obtain a reward by Formula 1 by using a torque command value in deceleration Tm, a target torque command value in deceleration Tt, and a coefficient a.

$$a \times \left(1 - \frac{|Tt - Tm|}{Tt}\right) \qquad \text{[Formula 1]}$$

(3) In the machine learning device according to (1) or (2) described above, the machine learning device may include an optimizing action information output unit (for example, an optimizing action information output unit 305 described later) configured to generate and output a ratio of the movement distance in acceleration and the movement distance in deceleration of the spindle motor, based on a value function updated by the value function update unit.

(4) A control system according to the present invention includes the machine learning device according to any of (1) to (3) described above, and a control device of a machine tool, that controls synchronous operation of a spindle motor and a feed axis motor.

(5) A control device according to the present invention includes the machine learning device according to any of (1) to (3) described above, and controls synchronous operation of a spindle motor and a feed axis motor.

(6) In the control system according to (4) described above, the control device (for example, a control device 200 described later) may include
a numerical control unit (for example, a numerical control unit 210 described later) configured to create a spindle command and a feed axis command based on a tapping program; a spindle control unit (for example, a spindle control unit 220 described later) configured to control rotation operation of the spindle motor according to the spindle command,
a rotation detection unit (for example, a rotation detection unit 230 described later) configured to detect a rotation position of the spindle motor, and
a feed axis control unit (for example, a feed axis control unit 240 described later) configured to control feed operation of the feed axis based on the rotation position, according to the feed axis command,
the numerical control unit may include a spindle command output unit (for example, a spindle command output unit 211 described later) configured to acquire a total rotation amount and the maximum rotation speed of the spindle motor from a start position to a target position, from the tapping program, to transmit the total rotation amount and the maximum rotation speed to the spindle control unit, as the spindle command, the spindle control unit may include an initial operation control unit (for example, an initial operation control unit 221 described later) configured to cause the spindle motor to acceleration rotate from the start position, by speed control with the maximum rotation speed as a target value,
a rotation amount detection unit (for example, a rotation amount detection unit 222 described later) configured to detect a rotation amount of the spindle motor based on the rotation position during the acceleration rotation,
a remained rotation amount detection unit (for example, a remained rotation amount detection unit 223 described later) configured to detect a remained rotation amount of the spindle motor from a current position to the target position based on the total rotation amount and the rotation position, a current speed detection unit (for example, a current speed detection unit 224 described later) configured to detect current speed of the spindle motor based on the rotation position, and
a positioning operation control unit (for example, a positioning operation control unit 225 described later) configured to cause the spindle motor to deceleration rotate and reach the target position by position control based on the ratio of the movement distance in acceleration and the movement distance in deceleration of the spindle motor, the remained rotation amount, and the current speed, after the acceleration rotation.

(7) In the control device according to (5) described above, the control device may include a numerical control unit (for example, a numerical control unit 210 described later) configured to create a spindle command and a feed axis command based on a tapping program,
a spindle control unit (for example, a spindle control unit 220 described later) configured to control rotation operation of the spindle motor according to the spindle command, a rotation detection unit (for example, a rotation detection unit 230 described later) configured to detect a rotation position of the spindle motor, and
a feed axis control unit (for example, a feed axis control unit 240 described later) configured to control feed operation of the feed axis based on the rotation position according to the feed axis command,
the numerical control unit may include a spindle command output unit (for example, a spindle command output unit 211 described later) configured to acquire a total rotation amount and the maximum rotation speed of the spindle motor from a start position to a target position, from the tapping program, and transmits the total rotation amount and the maximum rotation speed to the spindle control unit, as the spindle command, and
the spindle control unit may include an initial operation control unit (for example, an initial operation control unit 221 described later) configured to cause the spindle motor to acceleration rotate from the start position by speed control with the maximum rotation speed as a target value,
a rotation amount detection unit (for example, a rotation amount detection unit 222 described later) configured to detect a rotation amount of the spindle motor based on the rotation position during the acceleration rotation,
a remained rotation amount detection unit (for example, a remained rotation amount detection unit 223 described later) configured to detect a remained rotation amount of the spindle motor from a current position to the target position based on the total rotation amount and the rotation position, a current speed detection unit (for example, a current speed detection unit 224 described later) configured to detect a current speed of the spindle motor based on the rotation position, and
a positioning operation control unit (for example, a positioning operation control unit 225 described later) configured to cause the spindle motor to decelerate rotate and reach the target position by position control based on the ratio of the movement distance in acceleration and the movement distance in deceleration of the spindle motor, the remained rotation amount, and the current speed, after the acceleration rotation.

(8) A machine learning method according to the present invention is a machine learning method of a machine learning device (for example, a machine learning device 300 described later) that performs machine learning with respect to a control device (for example, a control device 200 described later) of a machine tool (for example, a machine tool 100 described later), the control device controlling synchronous operation of a spindle motor (for example, a spindle motor 101 described later) and a feed axis motor (for example, a feed axis motor 105 described later), the machine learning method including:
acquiring from the control device, state information including at least a torque command value with respect to the spindle motor, a drive state including deceleration of the spindle motor, and a ratio of a movement distance in acceleration and a movement distance in deceleration of the spindle motor, by causing the control device to execute a tapping program; outputting action information including adjustment information of the ratio of the movement distance in acceleration and the movement distance in deceleration of the spindle motor included in the state information, to the control device; outputting a reward value in reinforcement learning based on a torque command value in deceleration included in the state information and a target torque command value in deceleration; and
updating an action value function based on the reward value, the state information, and the action information.

According to the present invention, while a motor ability in deceleration can be approximated to a target value, tapping operation can be stabled for each machine or each operation condition, with respect to a machining program.

DETAILED DESCRIPTION OF THE INVENTION

Embodiments of the present invention will be described in detail below with reference to drawings.

First Embodiment

A control system of a machine tool of the present embodiment includes a control device and a machine learning device, and is suitably used when tapping is performed by controlling synchronous operation of a spindle motor and a feed axis motor of the machine tool. Such tapping is called rigid tapping. The present embodiment will be described with the rigid tapping as an example. However, the present invention can be applied to machining performed by synchronous operation of a spindle motor and a feed axis motor, and is not particularly limited to the rigid tapping.

Figure 1:
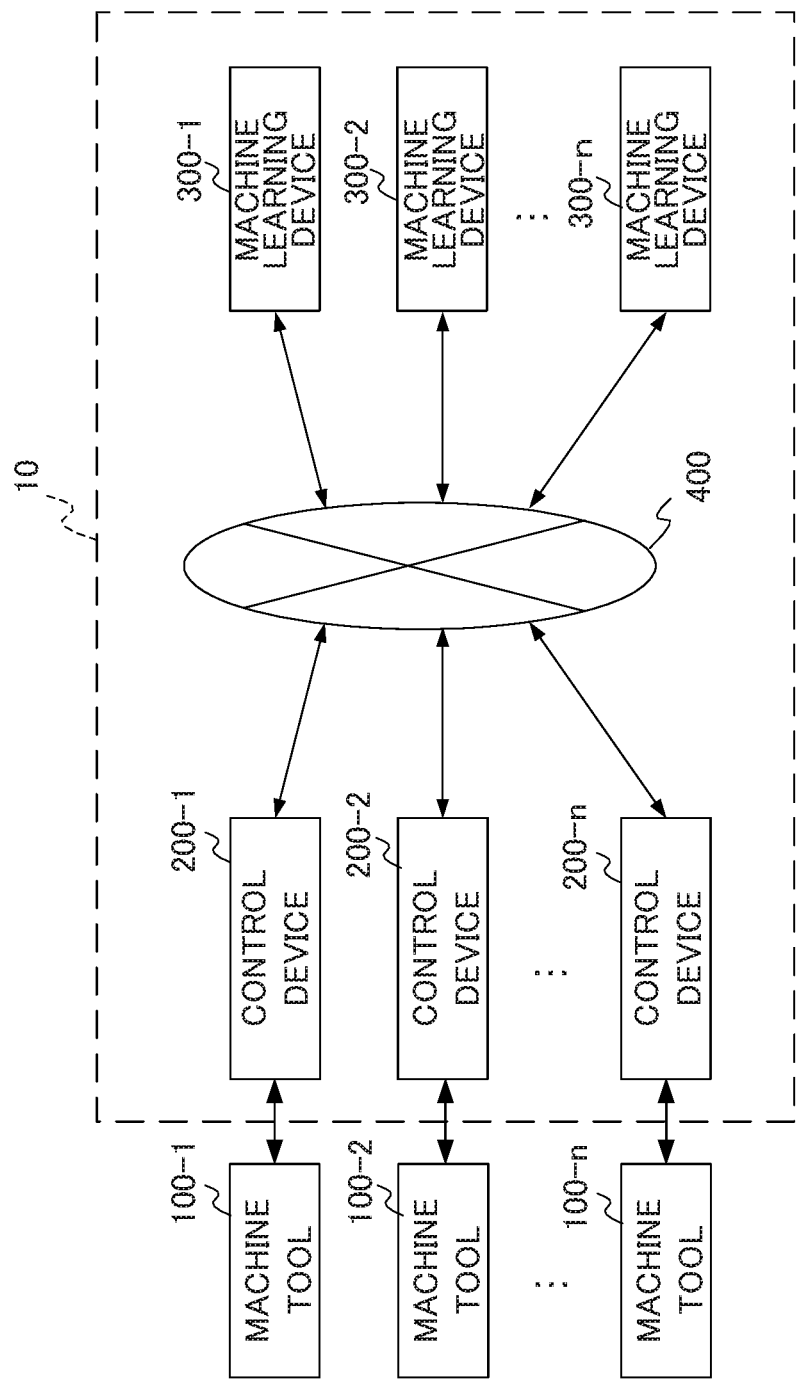
FIG. 1 is a block diagram showing a control system and a machine tool of a first embodiment of the present invention.

FIG. 1 is a block diagram showing a control system and a machine tool of a first embodiment of the present invention. As shown in FIG. 1, a control system 10 includes n control devices 200-1 to 200-n, a network 400, and machine learning devices 300-1 to 300-n connected to the control devices 200-1 to 200-n via the network 400. The n machine tools 100-1 to 100-n are connected to the n control devices 200-1 to 200-n. Note that n is an arbitrary natural number.

The machine tool 100-1 and the control device 200-1 are considered to be a set of one-to-one and are communicatively connected. The machine tool 100-2 to 100-n and the control devices 200-2 to 200-n are connected in the same way as the machine tool 100-1 and the control device 200-1. n sets of the machine tools 100-1 to 100-n and the control devices 200-1 to 200-n may be directly connected via a connection interface or connected via a network such as a local area network (LAN). For example, a plurality of n sets of the machine tools 100-1 to 100-n, and the control devices 200-1 to 200-n may be installed in the same factory or in different factories.

The control device 200-1 and the machine learning device 300-1 are considered to be a set of one-to-one and are communicatively connected. The control devices 200-2 to 200-n and the machine learning devices 300-2 to 300-n are connected in the same way as the control device 200-1 and the machine learning device 300-1. In FIG. 1, n sets of the control devices 200-1 to 200-n and the machine learning devices 300-1 to 300-n are connected via the network 400. However, regarding the n sets of the control devices 200-1 to 200-n and the machine learning devices 300-1 to 300-n, the control devices and the machine learning devices in each of the sets may be directly connected via a connection interface. The network 400 is, for example, a local area network (LAN) constructed in a factory, the Internet, a public telephone network, or combination thereof. The communication method in the network 400, and whether a wired connection or a wireless connection is used, are not particularly limited.

Figure 2:
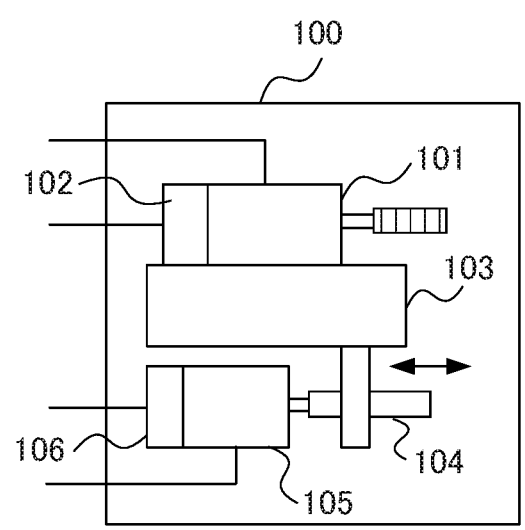
FIG. 2 is a diagram showing a configuration of the machine tool.
Figure 3:
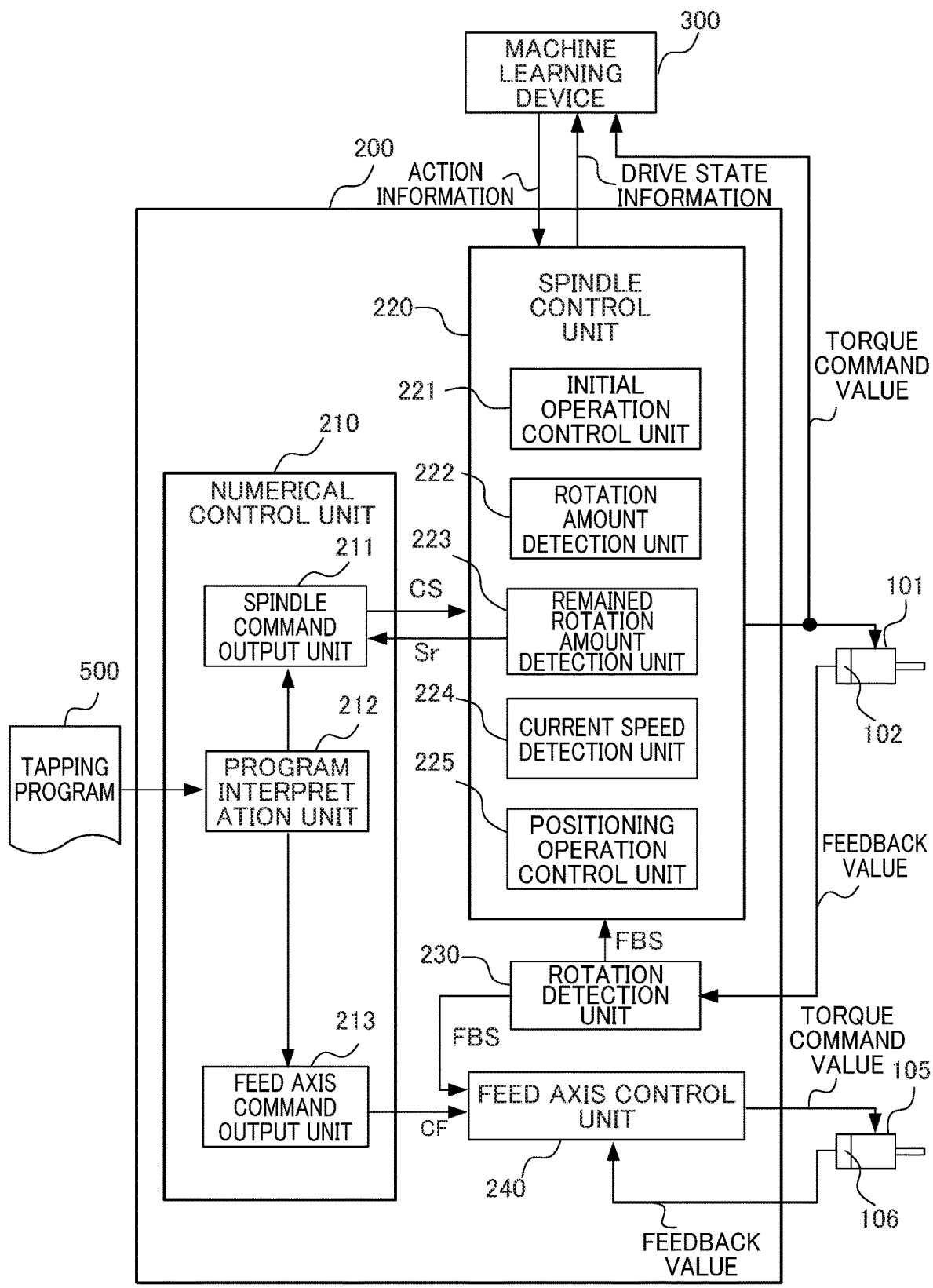
FIG. 3 is a block diagram showing a configuration of a control device of the control system of the first embodiment of the present invention.

Next, configurations of the machine tools 100-1 to 100-n, the control devices 200-1 to 200-n, and the machine learning devices 300-1 to 300-n included in the control system 10 will be described. FIG. 2 is a diagram showing a configuration of the machine tool 100 of the control system 10 of the first embodiment of the present invention. FIG. 3 is a block diagram showing a configuration of the control device 200 of the control system 10 of the first embodiment of the present invention. The machine tool 100 of FIG. 2, and the control device 200 of FIG. 3 correspond to, for example, the machine tool 100-1, and the control device 200-1 shown in FIG. 1, respectively. The machine tools 100-2 to 100-n, and the control devices 200-2 to 200-n also have the same configurations.

First, the machine tool 100 will be described. As shown in FIG. 2, the machine tool 100 includes: a spindle motor 101; a position detector 102 such as an encoder coupled to the spindle motor 101; a support unit 103 that supports the spindle motor 101; a ball screw 104 that linearly moves the support unit 103; a feed axis motor 105 connected to the ball screw 104; and a position detector 106 such as an encoder coupled to the feed axis motor 105.

A tool is attached to a rotation axis of the spindle motor 101, and the spindle motor 101 is a motor such as a servo motor that causes the rotation axis to rotate at a required speed. The feed axis motor 105 is a motor such as a servo motor that causes the support unit 103 attached with the spindle motor 101, to perform feeding with respect to a workpiece at a speed required for machining.

FIG. 2 shows a machine tool that is performing rigid tapping by linearly feeding a tool rotated by the spindle motor 101, with respect to the workpiece by the feed axis motor 105. However, the machine tool may linearly feed the tool by the feed axis motor 105 with respect to the workpiece rotated by the spindle motor 101, or may linearly feed the workpiece rotated by the spindle motor 101 by the feed axis motor 105 with respect to the tool. The machine tool can linearly feed the workpiece by the feed axis motor 105 with respect to the tool rotated by the spindle motor 101. In any of the cases, the feed axis motor 105 having relatively large margins in an acceleration and deceleration torque during operation operates so as to follow the spindle motor 101 having relatively small margins in an acceleration and deceleration torque during operation, and thereby, synchronous errors can be reduced and machining accuracy can be improved.

Next, the control device 200 will be described. As shown in FIG. 3, the control device 200 is a device that controls synchronous operation (so called, a master slave synchronization) in which the feed axis motor 105 operates to follow rotation operation of the spindle motor 101 in consideration of a screw pitch specified in a tapping program 500, in a machine tool (for example, a lathe, a drill press, a machining center, or the like) that performs tapping by synchronous operation of the spindle motor 101 and the feed axis motor 105.

The control device 200 includes a numerical control unit 210, a spindle control unit 220, a rotation detection unit 230, and a feed axis control unit 240.

The numerical control unit 210 includes a spindle command output unit 211, a program interpretation unit 212, and a feed axis command output unit 213.

Before start of the tapping, the spindle command output unit 211 acquires a total rotation amount S0 of the spindle motor 101 from a machining start position (rotation position) to a target screw depth (rotation position), and the maximum rotation speed V0, from a command value of the tapping program 500 interpreted by the program interpretation unit 212. The spindle command output unit 211 transmits the total rotation amount S0 and the maximum rotation speed V0 to the spindle control unit 220, as a spindle command CS. For example, when the tapping program 500 includes a command of machining a female screw having a screw pitch of 1.25 mm, and a screw depth of 30 mm, with the maximum rotation speed (in this example, the maximum speed per a minute) V0 of the spindle motor 101 being 3000 rev/min, the total rotation amount S0 of the spindle motor 101 from the machining start position to the target screw depth is 30/1.25=24 (rev). Accordingly, the spindle command output unit 211 notifies the spindle control unit 220 with the maximum rotation speed V0=3000 (rev/min) and the total rotation amount S0=24 (rev). In this way, the spindle command CS does not include a position command and an acceleration and deceleration command for rotating the spindle motor 101 to the target screw depth.

The program interpretation unit 212 interprets the tapping program 500. The feed axis command output unit 213 creates a feed axis command CF in accordance with the interpretation by the program interpretation unit 212, to transmit the feed axis command CF to the feed axis control unit 240.

The spindle control unit 220 includes an initial operation control unit 221, a rotation amount detection unit 222, a remained rotation amount detection unit 223, a current speed detection unit 224, and a positioning operation control unit 225. The initial operation control unit 221 causes the spindle motor 101 to acceleration rotate with the maximum ability from the machining start position, by speed controlling with the maximum rotation speed V0 transmitted from the spindle command output unit 211, as a target value. The rotation amount detection unit 222 detects a rotation amount of the spindle motor 101 from the rotation start, based on a rotation position FBS output from the rotation detection unit 230 during the acceleration rotation. The rotation amount from when the acceleration rotation of the spindle motor 101 starts until when the maximum rotation speed V0 is reached is a movement distance in acceleration. The remained rotation amount detection unit 223 detects a remained rotation amount Sr of the spindle motor 101 from the current position (rotation position) to the target screw depth, based on the total rotation amount S0 transmitted from the spindle command output unit 211, and a rotation position FBS output from the rotation detection unit 230. The remained rotation amount detection unit 223 transmits the remained rotation amount Sr detected, to the numerical control unit 210 for every detection. The numerical control unit 210 determines that a tip end of the tool reaches the target screw depth in the tapping, by the remained rotation amount Sr. The current speed detection unit 224 detects a current speed Vc of the spindle motor 101, based on the rotation position FBS output from the rotation detection unit 230. The current speed detection unit 224 changes the rotation of the spindle motor 101 from the acceleration rotation to rotation of the maximum rotation speed V0, when the current speed Vc reaches the maximum rotation speed V0. The positioning operation control unit 225 performs position control for causing the spindle motor 101 to deceleration rotate to reach the target screw depth, based on the ratio of the movement distance in acceleration and the movement distance in deceleration received from the machine learning device 300, the remained rotation amount Sr that has been detected by the remained rotation amount detection unit 223, and the current speed Vc that has been detected by the current speed detection unit 224, after the rotation at the maximum rotation speed V0. The positioning operation control unit 225 may perform transition from the acceleration rotation to the deceleration rotation before the current speed Vc of the spindle motor 101 reaches the maximum rotation speed. For example, when the ratio of the movement distance in acceleration and the movement distance in deceleration is 1:m (m≤1), if the rotation amount detection unit 222 has detected that the rotation amount of the spindle motor 101 has reached 1/(1+m) of the total rotation amount S0 from the rotation start, the positioning operation control unit 225 transfers the acceleration rotation of the spindle motor 101 to the deceleration rotation.

The spindle control unit 220 transmits the torque command value to the spindle motor 101 by general feedback control, by using the rotation position FBS (that is, a feedback value) of the spindle motor 101 detected by the rotation detection unit 230, to control the rotation of the spindle motor 101.

The rotation detection unit 230 can acquire the rotation position FBS from output by the position detector 102 such as an encoder that detects the operation position of the spindle motor 101. The feed axis control unit 240 controls feed operation of the feed axis motor 105 following the operation of the spindle motor 101 by the feedback control, by using the feedback value of the feed position from the position detector 102 such as an encoder that detects the operation position of the feed axis motor 105, and the rotation position FBS of the spindle motor 101, in accordance with the feed axis command CF that has been transmitted from the feed axis command output unit 213. The feed axis control unit 240 linearly feeds the feed axis motor 105 in a Z direction, with respect to the workpiece. However, the control device 200 may further include two axis control units that control two axis motors that feed the workpiece or the tool in an X axis direction and a Y axis direction.

Figure 4:
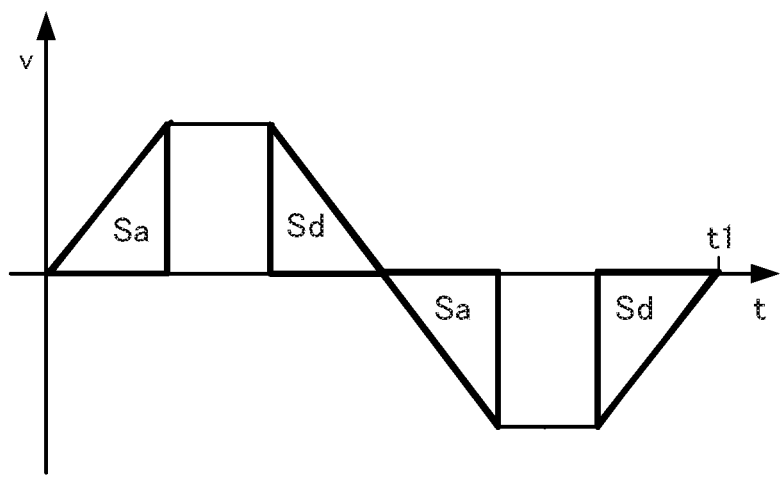
FIG. 4 is a diagram showing a relationship between a rotation speed v of a spindle motor in deceleration and time t of when a ratio of a movement distance in acceleration Sa and a movement distance in deceleration Sd is 1:1.

Operation of the spindle control unit 220 will be specifically described below with reference to FIG. 4. Here, a case where the ratio of the movement distance in acceleration Sa and the movement distance in deceleration Sd is 1:1, will be described. FIG. 4 is a diagram showing a relationship between a rotation speed v of the spindle motor in deceleration and time t in a case where the ratio of the movement distance in acceleration Sa and the movement distance in deceleration Sd is 1:1. FIG. 4 shows one cycle in tapping, until when the tool reaches the target screw depth from the surface of the workpiece, stops, and is drawn from the target screw depth to the surface of the workpiece. Time t1 in FIG. 4 indicates time (cycle time) of one cycle.

First, operation of tapping from a surface of the workpiece to the target screw depth, by a tool, will be described. The initial operation control unit 221 causes the spindle motor 101 to acceleration rotate with the maximum ability from the machining start position, by speed control with a target value being the maximum rotation speed V0 that has been transmitted from the spindle command output unit 211. The rotation amount detection unit 222 detects the rotation amount of the spindle motor 101 from the rotation start. When the current speed detection unit 224 detects that the current speed Vc has reached the maximum rotation speed V0, the initial operation control unit 221 causes the spindle motor 101 to rotate at the maximum rotation speed V0. The rotation amount detection unit 222 obtains the rotation amount (movement distance in acceleration) from when the spindle motor 101 starts the acceleration rotation until when the maximum rotation speed V0 is reached. The movement distance in acceleration Sa is an integrated value of an integral (v*t) of the rotation speed v of the spindle motor and the time t from when the spindle motor 101 starts rotation, and accelerates, until when the maximum rotation speed V0 is reached. When the remained rotation amount Sr of the spindle motor 101 detected by the remained rotation amount detection unit 223 is equal to the movement distance in acceleration (rotation amount in acceleration) Sa, the positioning operation control unit 225 causes deceleration rotation by setting acceleration of the deceleration so that a tip end of the tool stops in the target screw depth. The acceleration of deceleration is obtained by the remained rotation amount Sr and the current speed Vc. A rotation period tr of deceleration is obtained by (remained rotation amount Sr)/(current speed Vc), and the acceleration in deceleration is obtained by (current speed Vc)/(rotation period tr of deceleration). The movement distance in deceleration Sd is an integrated value of an integral (v*t) of the rotation speed v of the spindle motor and the time t from when the spindle motor 101 starts deceleration rotation until when the spindle motor 101 stops. When transition is made from the acceleration rotation to the deceleration rotation before the current speed Vc of the spindle motor 101 reaches the maximum rotation speed, the movement distance in acceleration of until when transition is made to the deceleration rotation is the movement distance in deceleration, that is, the remained rotation amount Sr. The positioning operation control unit 225 can obtain the acceleration of deceleration, as similar to above.

Next, the spindle control unit 220 rotates and draws the tool from the target screw depth to the surface of the workpiece by the same operation as the operation of tapping from the surface of the workpiece to the target screw depth, excluding that the rotation direction of the spindle motor is reverse.

The spindle control unit 220 can control the operation (referred to as cutting) of the spindle motor 101 for cutting a hole of the workpiece to the target screw depth by the tool, in the tapping using the machine tool 100. The spindle control unit 220 can control operation (referred to as returning) of the spindle motor 101 for drawing the tool from the workpiece after the hole of the workpiece is performed with drilling to the target screw depth by using the tool, in the tapping using the machine tool.

The configurations of the machine tool 100 and the control device 200 are described above, and the configurations described above are portions particularly related to the operation of the present embodiment. Details of each configuration of the machine tool 100 and the control device 200, for example, a position control unit and a speed control unit for configuring position and velocity feedback loop in the spindle control unit 220 and the feed axis control unit, a motor drive amplifier that drives the spindle motor or the feed axis motor based on the torque command value, an operator's panel for receiving the operations of a user, and the like are well known by a skilled person. Therefore, detailed descriptions and illustrations thereof are omitted.

<Machine Learning Device 300>

Figure 5:
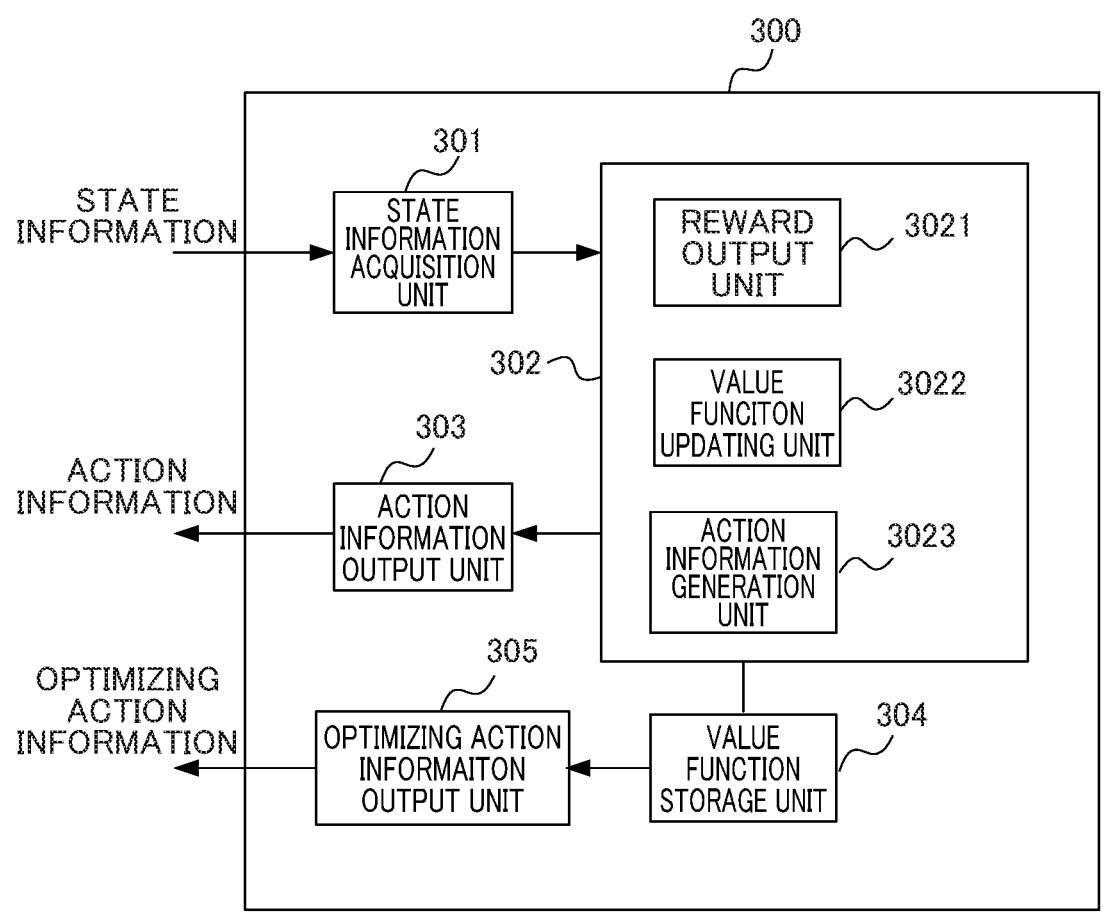
FIG. 5 is a block diagram showing a configuration of a machine learning device.

FIG. 5 is a block diagram showing the configuration of the machine learning device 300. The machine learning device 300 corresponds to, for example, the machine learning device 300-1 shown in FIG. 1. The machine tools 100-2 to 100-n have the similar configurations. The machine learning device 300 is a device that perform reinforcement learning with respect to the ratio of the movement distance in acceleration and the movement distance in deceleration in tapping in which the torque command value in deceleration is the closest to the torque command target value in deceleration, when the machine tool 100 is operated by the tapping program 500, by execution of the tapping program 500 by the control device 200, the tapping program 500 being prepared in advance.

Before each function block included in the machine learning device 300 is described, the basic mechanism of the reinforcement learning will be described. An agent (corresponding to the machine learning device 300 in the present embodiment) observes an environmental state and selects one action. The environment changes on the basis of that action. Some reward is given in accordance with the environmental change, and the agent learns the selection (decision) of a better action. While supervised learning presents a completely correct result, the reward in the reinforcement learning is often presented as a fragmental value based on a change in part of the environment. Thus, the agent learns to select an action so that the total reward in the future is maximized.

In this way, with reinforcement learning, the agent learns an action to learn a suitable action in consideration of a mutual effect of the action with the environment, that is, a method of learning for maximizing the reward to be obtained in the future. This represents that, for example, the machine learning device 300 of the present embodiment can gain an action that affects the future such as selecting action information (also referred to as "action") for reducing the cycle time while approximating the torque command value in deceleration to the torque command target value in deceleration.

As the reinforcement learning, an arbitrary learning method can be used. In the description below, a case where Q-learning is used will be described as an example. The Q-learning is a method of learning a value function Q (S, A) and selecting an action A under an environmental state S. An object of Q-learning is to select the action A having the highest value function Q (S, A) as an optimal action, from among actions A that can be taken in a state S.

However, at the time when Q-learning is initially performed, regarding a combination of the state S and the action A, the correct value of the value function Q (S, A) is not identified at all. Thus, the agent selects various actions A under a state S and selects a better action on the basis of the given reward with respect to the action A at that time, to learn the correct value function Q (S, A).

The agent tries to finally obtain Q (S, A)=E[Σ(γ$^t$)r$_t$] in order to maximize the total reward that can be obtained in the future. E[ ] represents an expected value, t represents time, γ represents a parameter called a discount rate described later, r$_t$ represents a reward at the time t, and Σ represents the total at the time t. The expected value in this formula is an expected value in a case where the state is changed according to the optimal action. However, the optimal action is not clear in the process of Q-learning. Therefore, the agent takes various actions to perform the reinforcement learning while searching. An updating formula of such value function Q (S, A) can be represented by, for example, the following Formula 2 (shown as Formula 2 below).

$$Q(S_{t+1}, A_{t+1}) \leftarrow$$
$$Q(S_t, A_t) + \alpha\left(r_{t+1} + \gamma \max_A Q(S_{t+1}, A) - Q(S_t, A_t)\right)$$
[Formula 2]

In the formula 2 described above, S$_t$ represents an environmental state at the time t, and A$_t$ represents an action at the time t. The state is changed to S$_{t+1}$ by the action A$_t$. r$_{t+1}$ represents a reward obtained by that state change. An item added with max is obtained by multiplying γ with the Q value of when the action A having the highest Q value that has been identified at that time is selected, under the state S$_{t+1}$. The γ is a parameter of 0<γ≤1 and is called a discount rate. α is a learning coefficient and is in a range of 0<α≤1.

The formula 2 described above represents a method of updating the value function Q (S$_t$, A$_t$) of the action A$_t$ in the state S$_t$, on the basis of the reward r$_{t+1}$ sent back as a result of the trial A$_t$. This updating formula represents that the Q (S$_t$, A$_t$) is set to be large when a value max$_a$ Q(S$_{t+1}$,A) of the best action in the next state S$_{t+1}$ by the action A$_t$ is larger than the value function Q (S$_t$, A$_t$) of the action A$_t$ in the state S$_t$, while, the Q (S$_t$, A$_t$) is set to be small when the value max$_a$ Q(S$_{t+1}$, A) of the best action in the next state S$_{t+1}$ by the action A$_t$ is smaller. That is, the updating formula indicates that a value of an action in a state is approximated to a value of the best action in the next state by the action. The difference between the value function Q (S$_t$, A$_t$) and the value max$_a$ Q (S$_{t+1}$, A) changes depending on the discount rate γ and the reward r$_{t+1}$. However, a mechanism is such that a value of the best action in a state is basically propagated to a value of an action in a state that is one before that state.

In Q-learning, there is a method of learning by creating a table of Q (S, A) for every state action pair (S, A). However, when the values of the Q (S, A) of all state action pairs are determined, the number of states is too large, and there is a case where a substantial amount of time is required for settling the Q-learning with the method.

Thus, a known technique called a Deep Q-Network (DQN) may be utilized. Specifically, the value function Q is configured by using an appropriate neural network and the parameters of the neural network are adjusted. As a result, the value of the value function Q (S, A) may be calculated by approximating the value function Q by the appropriate neural network. The time required for settling Q-learning can be reduced by utilizing the DQN. The DQN is described in detail in, for example, the Non-Patent Document below.

Non-Patent Document

"Human-level control through deep reinforcement learning", Volodymyr Mnih1 [online], [searched on Jan. 17, 2017], Internet <URL: http://files.davidqiu.com/research/nature14236.pdf>

The Q-learning described above is performed by the machine learning device 300. Specifically, the machine learning device 300 learns the value function Q to be selected, in consideration that the toque command value for driving the spindle motor 101 output from the control device 200, the drive state information (drive state of the spindle motor 101) indicating which of acceleration, deceleration, constant speed, and stop the spindle motor 101 is in, and the ratio of the movement distance in acceleration Sa and the movement distance in deceleration Sd are the state S, and adjustment of the ratio of the movement distance in acceleration Sa and the movement distance in deceleration Sd related to the state S is the action A.

The machine learning device 300 performs tapping by using the tapping program 500 to acquire the state information S including the torque command value, the drive state information of the spindle motor 101, and the ratio of the movement distance in acceleration Sa and the movement distance in deceleration Sd, from the control device 200, and output the action A. The machine learning device 300 calculates the reward by using the target value of the torque command value in deceleration in consideration that the torque command value in deceleration, obtained based on the torque command value and the drive state of the spindle motor 101 is determination information. The target value of the torque command value in deceleration is stored in the machine learning device 300 in advance. The machine learning device 300 gives a reward for every time an action A is performed. The machine learning device 300, for example, searches an optimal action A so that the total reward in the future is maximized through trial and error. As a result, the machine learning device 300 can select the optimal action A (that is, the optimal ratio of the movement distance in acceleration Sa and the movement distance in deceleration Sd with which the torque command value in deceleration is the closest to the torque command target value in deceleration) with respect to the state S including the torque command value, and the drive state information of the spindle motor 101, acquired by performing the tapping by using the program prepared in advance.

That is, the machine learning device 300 can select the action A with which the value of the value function Q is maximum from among the actions A applied to the ratio of the movement distance in acceleration Sa and the movement distance in deceleration Sd related to a state S on the basis of the value function Q that has been learned, to select the action A (that is, the ratio of the movement distance in acceleration Sa and the movement distance in deceleration Sd) with which the torque command value in deceleration is close to the torque command value that is a target.

FIG. 5 is a block diagram showing the machine learning device 300 of the first embodiment of the present invention. In order to perform the reinforcement learning described above, the machine learning device 300 includes, as shown in FIG. 5, a state information acquisition unit 301, a learning unit 302, an action information output unit 303, a value function storage unit 304, and an optimizing action information output unit 305.

The state information acquisition unit 301 acquires the state S including the torque command value for driving the spindle motor 101, the drive state information indicating which of acceleration, deceleration, constant speed, and stop the spindle motor 101 is in, and the ratio of the movement distance in acceleration Sa and the movement distance in deceleration Sd, from the control device 200. This state information (also referred to as "status") S corresponds to an environmental state S in Q-learning. The state information acquisition unit 301 outputs the acquired state information S to the learning unit 302. The ratio of the movement distance in acceleration Sa and the movement distance in deceleration Sd at the time when Q-learning is initially started are set in advance by the user. Here, the ratio of the movement distance in acceleration Sa and the movement distance in deceleration Sd at the time when Q-learning is initially started is set to be 1:1. The machine learning device 300 adjusts the ratio of the movement distance in acceleration Sa and the movement distance in deceleration Sd that has been set by the user, by reinforcement learning, to perform optimization so that the torque command value in deceleration is a value that is close to the torque command value that is a target.

The learning unit 302 is a unit that learns the value function Q (S, A) of when an action A is selected under state information (an environmental state) S. Specifically, the learning unit 302 includes a reward output unit 3021, a value function updating unit 3022, and an action information generation unit 3023.

The reward output unit 3021 is a unit that calculates the reward for when the action A is selected under a state S. The machine tool 100 operates based on the ratio of the movement distance in acceleration Sa and the movement distance in deceleration Sd in the state S and the state S' when the transition is made from the state S to the state S' by the action A. An average value of a set of the torque command value in deceleration in one cycle of the machine tool 100 of when transition is made from the state S to the state S' by the action A is considered to be a torque command value Tm(S) and a torque command value Tm(S'). For example, the reward output unit 3021 can calculate the reward based on the average value Tm of the set of the torque command value in deceleration and the target value Tt of the torque command value in deceleration. Here, the target value Tt of the torque command value in deceleration is set to be a slightly smaller value than the maximum value of the torque command value in deceleration, for example, 95% of the maximum value of the torque command value in deceleration. The target value Tt of the torque command value in deceleration is not limited to 95% of the maximum value.

Specifically, the reward can be obtained by the following Formula 3 (shown as Formula 3 below) by using the torque command value Tm at the time of deceleration, the target torque command value in deceleration Tt, and the coefficient a.

$$a \times \left(1 - \frac{|Tt - Tm|}{Tt}\right) \qquad \text{[Formula 3]}$$

As is clear from Formula 3, the reward can be obtained based on each of the torque command values Tm(S), Tm(S'). When the torque command value Tm(S') is far from the target torque command value Tt further than the torque command value Tm(S), the reward is a lower value than the torque command value Tm(S). When the torque command value Tm(S') approaches the target torque command value Tt further than the torque command value Tm(S), the reward is a higher value than the torque command value Tm(S).

Note that the method described above is an example method of applying the reward, and the method may be a method described below. For example, when the torque command value Tm(S') is far from the target torque command value Tt further than the torque command value Tm(S), the reward is a negative value. When the torque command value Tm(S') is equal to the torque command value Tm(S), the reward is zero. When the torque command value Tm(S') approaches the target torque command value Tt further than the torque command value Tm(S), the reward is a positive value. In this way, the reward is calculated. The reward output unit 3021 may set the reward to be a positive value when the torque command value Tm(S') is equal to the torque command value Tm(S), and may set the reward to be a positive value that is larger than the reward of when the torque command value Tm(S') is equal to the torque command value Tm(S), when the torque command value Tm(S') approaches the target torque command value Tt further than the torque command value Tm(S).

The value function updating unit 3022 performs Q-learning on the basis of the state S, the action A, the state S' when the action A is applied to the state S, and the overall reward value calculated as described above to update the value function Q that the value function storage unit 304 stores. The updating of the value function Q may be performed by online learning, batch learning, or mini-batch learning.

Online learning is a learning method of applying an action A to the current state S to update the value function Q immediately every time the state S makes a transition to a new state S'. Batch learning is a learning method of applying an action A to the current state S to repeat the transition of the state S to the new state S' to collect learning data and perform updating of the value function Q by using all of the collected learning data. Mini-batch learning is an intermediate learning method between the online learning and the batch learning and is a learning method of performing updating of the value function Q every time certain pieces of learning data are accumulated.

The action information generation unit 3023 selects the action A in a process of Q-learning with respect to the current state S. The action information generation unit 3023 generates the action information A in order to cause an operation (corresponding to the action A in Q-learning) of modifying the ratio of the movement distance in acceleration Sa and the movement distance in deceleration Sd in the process of Q-learning to be performed, to output the generated action information A to the action information output unit 303.

More specifically, the action information generation unit 3023, for example, adjust the ratio of the movement distance in acceleration Sa and the movement distance in deceleration Sd by the action A, thereby increasing or decreasing the ratio of the movement distance in acceleration Sa and the movement distance in deceleration Sd included in the state S. Here, the action information generation unit 3023 sets the movement distance in acceleration Sa to be constant and performs modification to the movement distance in deceleration Sd in the state S to the movement distance in deceleration Sd' in the state S'. When the ratio of the movement distance in acceleration Sa and the movement distance in deceleration Sd is adjusted by the action A and transition is made to the state S', the action information generation unit 3023 may select the ratio of the movement distance in acceleration Sa and the movement distance in deceleration Sd by the following action A' by whether the torque command value in deceleration Tm(S') has approached the target torque command value Tt or has exceeded the target torque command value Tt. For example, when the torque command value in deceleration Tm(S') approaches the target torque command value Tt, the action information generation unit 3023 can decrease the ratio of the movement distance in deceleration Sd with respect to the movement distance in acceleration Sa, and when the torque command value in deceleration Tm(S') exceeds the target torque command value Tt, the action information generation unit 3023 can increase the ratio of the movement distance in deceleration Sd with respect to the movement distance in acceleration Sa.

The action information generation unit 3023 may take a measure of selecting the action A' by a known method such as the greedy method of selecting the action A' having the highest value function Q (S, A) from among the values of the action A currently estimated, or the ε greedy method of randomly selecting the action A' with a small probability e, and apart from that, selecting the action A' having the highest value function Q (S, A).

The action information output unit 303 is a unit that transmits the action information A output from the learning unit 302 to the control device 200.

The value function storage unit 304 is a storage device that stores the value function Q. The value function Q may be stored as a table (hereinafter referred to as an action value table) for, for example, every state S and action A. The value function Q stored in the value function storage unit 304 is updated by the value function updating unit 3022. The value function Q stored in the value function storage unit 304 may be shared with other machine learning devices 300. When the value function Q is shared among a plurality of machine learning devices 300, distributed reinforcement learning can be performed by the machine learning devices 300. Thus, the efficiency of the reinforcement learning can be improved.

The optimizing action information output unit 305 creates the action information A (hereinafter, referred to as "optimizing action information") for causing the machine tool 100 to perform an operation with which the value function Q (S, A) is maximized on the basis of the value function Q that has been updated by performing Q-learning by the value function updating unit 3022. More specifically, the optimizing action information output unit 305 acquires the value function Q stored in the value function storage unit 304. This value function Q is updated by the value function updating unit 3022 performing Q-learning as described above. Then, the optimizing action information output unit 305 creates the action information on the basis of the value function Q to output the created action information to the control device 200. This optimizing action information includes information of modifying the ratio of the movement distance in acceleration Sa and the movement distance in deceleration Sd, similarly to the action information output in the process of Q-learning by the action information output unit 303.

The control device 200 modifies the ratio of the movement distance in acceleration Sa and the movement distance in deceleration Sd that is currently set on the basis of the optimizing action information, to generate the torque command value. In this way, the machine tool 100 can operate the control device 200 so that tapping is stable for each machine or each operation condition, and the machining cycle time for each machine is further short, while approximating the torque command value in deceleration Tm to the target value Tt of the torque command value in deceleration.

The function blocks included in the control device 200 and the machine learning device 300 have been described above. In order to realize these function blocks, both the control device 200 and the machine learning device 300 include an operation processing device such as a central processing unit (CPU). Both the control device 200 and the machine learning device 300 also include an auxiliary storage device such as a hard disk drive (HDD) storing various control programs such as application software and an operating system (OS) and a main storage device such as a random access memory (RAM) for storing data temporarily required for execution of the program by the operation processing device.

In both of the control device 200 and the machine learning device 300, while reading the application software and the OS from the auxiliary storage device and decompressing the read application software and OS into the main storage device, the operation processing device performs operation processing based on the application software or OS. The operation processing device controls various hardware included in each device on the basis of this operation result. As a result, the function blocks of the present embodiment are realized. That is, the present embodiment can be realized by the cooperation of hardware and the software.

The machine learning device 300 performs a large number of operations associated with machine learning. Thus, it is desirable that, for example, a personal computer is mounted with graphics processing units (GPUs). The machine learning device 300 can perform high-speed processing by utilizing the GPUs for the operation processing associated with the machine learning by a technique called general-purpose computing on graphics processing units (GPGPU). Further, in order to perform higher speed processing, a plurality of such computers mounted with the GPUs may be used to construct a computer cluster so that the machine learning device 300 performs parallel processing using the plurality of computers included in the computer cluster.

Figure 6:
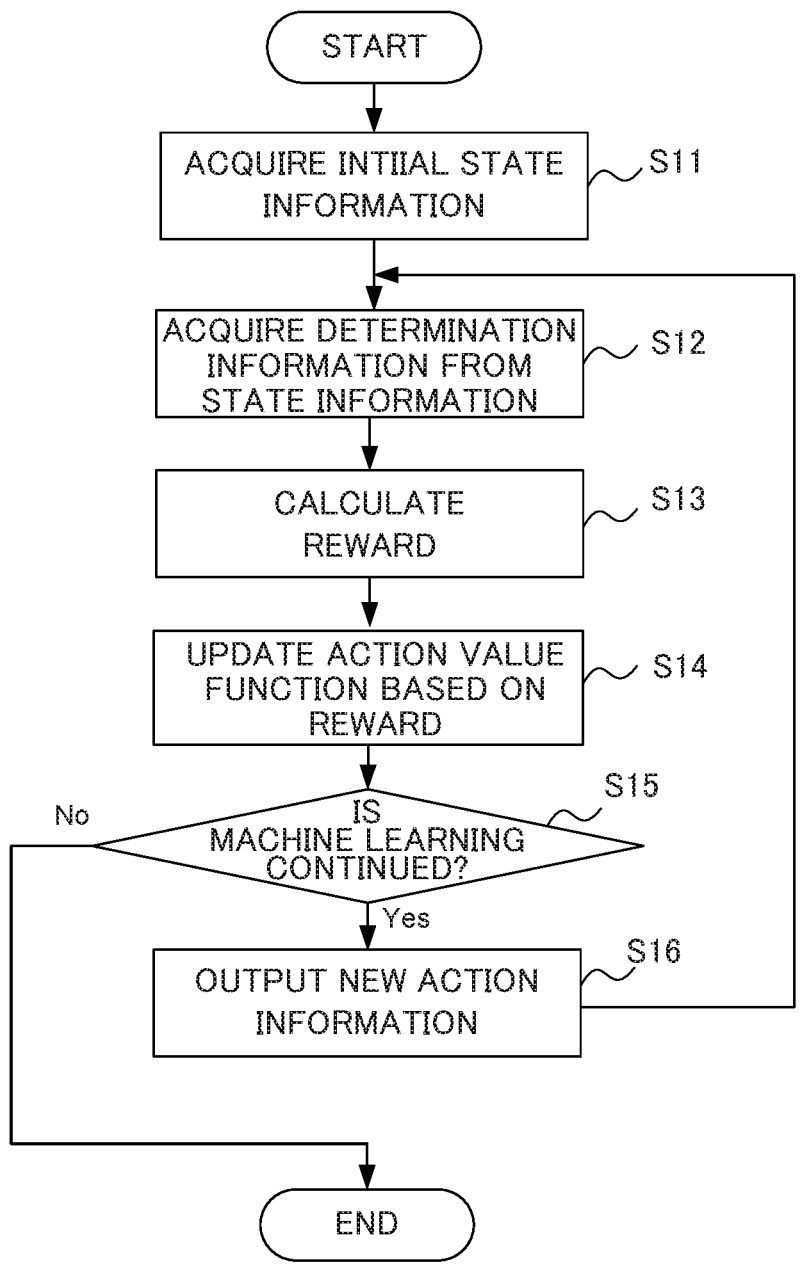
FIG. 6 is a flowchart showing the operation of the machine learning device at the time of Q-learning in an embodiment.

Next, the operation of the machine learning device 300 at the time of Q-learning in the present embodiment will be described with reference to flowcharts of FIG. 6. FIG. 6 is a flowchart showing the operation of the machine learning device 300 at the time of Q learning in the present embodiment. Note that, it is assumed that the tapping program 500 to be optimized is prepared, and each parameter value (for example, the target value Tt of the torque command value in deceleration, the maximum number of trials, and the like) is set in advance.

First, in step S11, the state information acquisition unit 301 acquires initial state information from the control device 200. The acquired state information is output to the value function updating unit 3022 and the action information generation unit 3023. As described above, this state information is information corresponding to the state S in Q-learning, and includes the torque command value with respect to the spindle motor 101, the drive state information (drive state information of the spindle motor 101) indicating which of acceleration, deceleration, constant speed, and stop the spindle motor 101 is in, and the ratio of the movement distance in acceleration Sa and the movement distance in deceleration Sd, at the time of step S11. In the present embodiment, the movement distance in acceleration Sa is constant. The ratio of the movement distance in acceleration Sa and the movement distance in deceleration Sd at the time when Q-learning is initially started are set by the user in advance, and is set to 1:1 here. In the present embodiment, the machine learning device 300 adjusts the ratio of the movement distance in acceleration Sa and the movement distance in deceleration Sd created by the user to be more optimal values through reinforcement learning.

In step S12, the state information acquisition unit 301 obtains the torque command value in deceleration Tm(S) related to the state S in one cycle in tapping, by the torque command value with respect to the spindle motor 101 related to the state S, and the drive state information of the spindle motor 101, and sets this torque command value in deceleration Tm(S) to be determination information. The state information acquisition unit 301 outputs the acquired state information and the determination information to the learning unit 302.

In step S13, the reward output unit 3021 calculates the reward on the basis of the determination information that has been input, that is, the torque command value in deceleration Tm(S). In step S13, the reward output unit 3021 uses the torque command value in deceleration Tm(S) related to the state S and the target value Tt of the torque command value in deceleration with respect to the spindle motor 101, to calculate the reward by Formula 3 described above.

When step S13 ends, in step S14, the value function updating unit 3022 updates the value function Q stored in the value function storage unit 304 on the basis of the overall reward value. Next, in step S15, the value function update unit 3022 determines whether the machine learning is continued. Whether the machine learning is continued is determined by whether the current number of trials has reached the maximum number of trials. When the maximum number of trials is not reached, the processing proceeds to step S16. When the maximum number of trials is reached, the processing ends.

Figure 7:
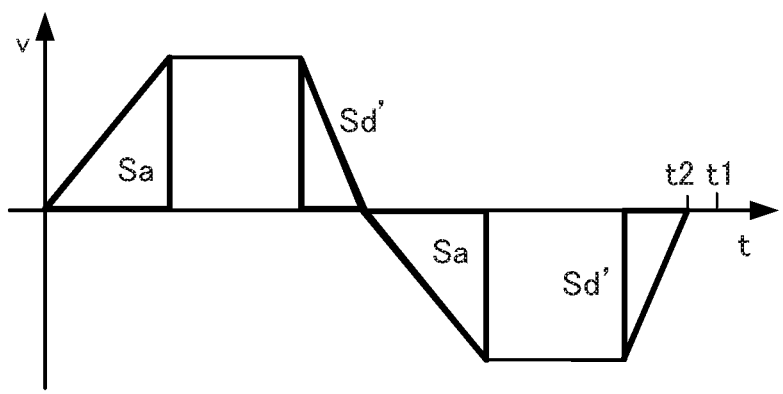
FIG. 7 is a diagram showing a relationship between the rotation speed v of the spindle motor in deceleration and the time t, of when the ratio of the movement distance in acceleration Sa and a movement distance in deceleration after correction Sd' is 1:0.7.

In step S16, the action information generation unit 3023 generates new action information A, and outputs the generated new action information A to the control device 200 via the action information output unit 303. The control device 200 that has received the action information modifies the ratio of the movement distance in acceleration Sa and the movement distance in deceleration Sd related to the current state S based on the received action information to make a transition to the State S', and drives the machine tool 100 by the state S' modified to perform tapping. For example, the control device 200 modifies the state S in which the ratio of the movement distance in acceleration Sa and the movement distance in deceleration Sd is 1:1 shown in FIG. 4 to the state S' in which the ratio is 1:0.7. FIG. 7 is a diagram showing a relationship between the rotation speed v of the spindle motor in deceleration and the time t of when the ratio of the movement distance in acceleration Sa and a movement distance in deceleration after correction Sd' is 1:0.7. Time of one cycle (cycle time) is changed from time t1 to time t2 smaller than time t1. When step S16 ends, the processing returns to step S12.

Here, specific operation of the control device 200 in step S16 and next step S12 will be specifically described with reference to FIG. 3

As shown in FIG. 3, the spindle control unit 220 transmits the drive state information (drive state information of the spindle motor 101) indicating which of acceleration, deceleration, constant speed, and stop the spindle motor 101 is in to the machine learning device 300, based on the current speed Vc detected by the current speed detection unit 224, the acceleration state controlled by the initial operation control unit 221, and the deceleration state controlled by the positioning operation control unit 225. The spindle control unit 220 transmits the torque command value not only to the spindle motor 101 but also to the machine learning device 300. The spindle control unit 220 transmits the ratio of the movement distance in acceleration Sa and the movement distance in deceleration Sd in one cycle of tapping performed in the tapping program 500, to the machine learning device 300. The torque command value, the drive state information of the spindle motor 101, and the ratio of the movement distance in acceleration Sa and the movement distance in deceleration Sd are the state information S to be transmitted to the machine learning device 300. The spindle control unit 220 receives the ratio of the movement distance in acceleration Sa and the movement distance in deceleration Sd from the machine learning device 300, as action information. The positioning operation control unit 225 obtains the movement distance in deceleration Sd from the ratio and the movement distance in acceleration Sa detected by the rotation amount detection unit 222. When the ratio of the movement distance in acceleration Sa and the movement distance in deceleration Sd is 1:0.7 as shown in FIG. 7, the positioning operation control unit 225 obtains the movement distance in deceleration Sd by multiplying the movement distance in acceleration Sa detected by the rotation amount detection unit 222, by 0.7. When the remained rotation amount Sr reaches the movement distance in deceleration Sd that has been obtained, the deceleration starts. The acceleration in deceleration can be obtained based on the movement distance in deceleration (remained rotation amount Sr) that has been obtained and the current speed Vc, as already described.

Figure 8:
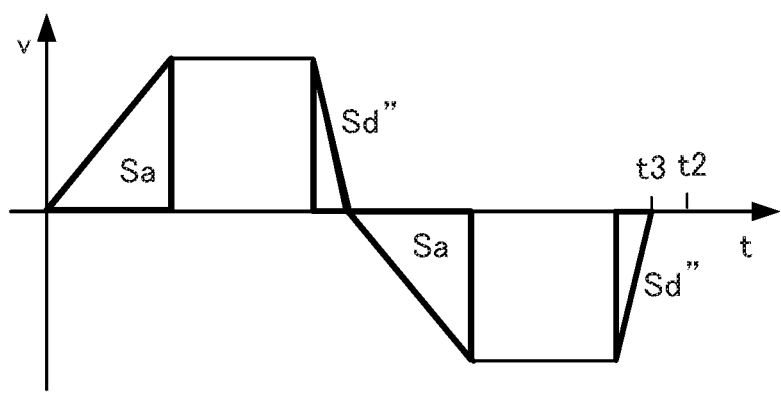
FIG. 8 is a diagram showing a relationship between the rotation speed v of the spindle motor in deceleration and the time t, of when the ratio of the movement distance in acceleration Sa and a movement distance in deceleration after correction Sd" is 1:0.4.

When the processing from next step S12 to next step S15 ends, in next step S6, for example, the state S' in which the ratio of the movement distance in acceleration Sa and the movement distance in deceleration Sd' is 1:0.7 shown in FIG. 7 is modified to a state S" in which the ratio is 1:0.4. FIG. 8 is a diagram showing a relationship between the rotation speed v of the spindle motor in deceleration and the time t of when the ratio of the movement distance in acceleration Sa and a movement distance in deceleration after correction Sd" is 1:0.4. The time of one cycle (cycle time) is changed from time t2 to time t3 smaller than time t2. The processing from step S12 to step S16 is repeated until the maximum number of trials is reached. Here, the processing ends when the number of trials reaches the maximum number of trials. However, the processing may end with a condition that the processing from step S12 to step S16 is repeated for a predetermined time.

A case where the ratio of the movement distance in deceleration Sd with respect to the movement distance in acceleration Sa is decreased in step S16 described above has been described. However, the machine learning device 300 also increases the ratio of the movement distance in deceleration Sd with respect to the movement distance in acceleration Sa to perform machine learning. Although online updating is exemplified in step S14, batch updating or mini-batch updating may be performed instead of the online updating.

As described above, by the operation described with reference to FIG. 6, the present embodiment exhibits an effect capable of generating the value function Q for stabilizing tapping for each machine or each operation condition, with respect to a machining program and generating the action information for further reducing the cycle time while approximating a motor ability in deceleration to the target value.

Figure 9:
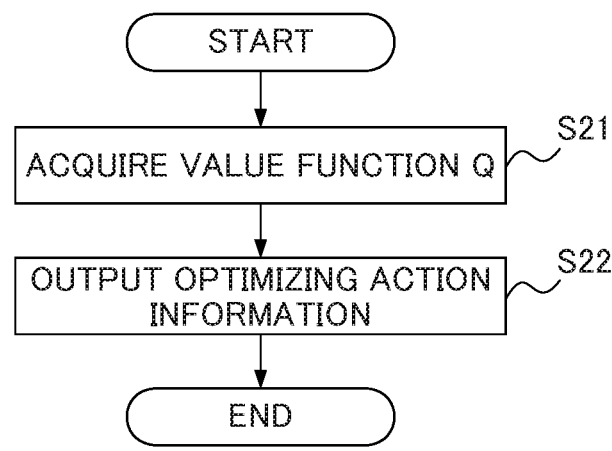
FIG. 9 is a flowchart showing operation at the time of generation of optimizing action information by an optimizing action information output unit.

Next, operation at the time of generation of optimizing action information by the optimizing action information output unit 305 will be described with reference to a flowchart of FIG. 9. First, in step S21, the optimizing action information output unit 305 acquires the value function Q stored in the value function storage unit 304. The value function Q is a function that has been updated by performing Q-learning by the value function updating unit 3022 as described above.

In step S22, the optimizing action information output unit 305 generates the optimizing action information on the basis of the value function Q to output the generated optimizing action information to the control device 200.

As described above, the control device 200 generates the torque command value based on the optimizing action information, and thereby, the machine tool 100 can stabilize the tapping for each machine or operation condition and further reduce the cycle time while approximating the motor ability in deceleration to the target value.

The embodiments of the present invention have been described above. Both the control device and the machine learning device may be realized by hardware, software, or combination thereof. The machine learning method performed by the cooperation of both the control device and the machine learning device described above also may be realized by hardware, software, or combination thereof. Being realized by software means being realized by a computer reading and executing a program.

The program may be stored by using various types of non-transitory computer readable media and supplied to the computer. The non-transitory computer readable media include various types of tangible storage media. Examples of the non-transitory computer readable media include a magnetic recording medium (for example, a hard disk drive), a magneto-optical recording medium (for example, a magneto-optical disk), a CD-ROM (read-only memory), a CD-R, a CD-R/W, a semiconductor memory (for example, a mask ROM, a programmable ROM (PROM), an erasable PROM (EPROM), a flash ROM, or a random access memory (RAM)).

Although the embodiments described above are preferable embodiments of the present invention, the scope of the present invention is not limited to the embodiments described above. The present invention may be performed in an embodiment in which various modifications are made without departing from the scope of the present invention.

<Variations>

In the embodiments described above, the machine learning device 300 is realized by a different device from the tool machine 100 and the control device 200. However, part or all of the functions of the machine learning device 300 may be realized by the tool machine 100 or the control device 200. Part or all of the functions of the machine learning device 300 may be realized by the numerical control unit 210 of the control device 200 or the spindle control unit 220. A machine learning unit having part or all of the functions of the machine learning device 300 may be provided in the control device 200 separately from the numerical control unit 210 or the spindle control unit 220. The optimizing action information output unit 305 of the machine learning device 300 may be a different optimizing action information output device from the machine learning device 300. In this case, one or a plurality of optimizing action information output devices may be provided with respect to a plurality of machine learning devices 300, to be used with sharing.

<Degree of Freedom with System Configuration>

In the embodiments described above, the machine learning device 300 and the control device 200 are communicatively connected as a set of one-to-one. However, for example, one machine learning device 300 may be communicatively connected to a plurality of control devices 200 via the network 400 to perform machine learning of each control device 200. At that time, respective functions of the machine learning device 300 may be realized by a distributed processing system in which the functions are distributed in a plurality of servers as appropriate. The functions of the machine learning device 300 may be realized by utilizing a virtual server function or the like in the cloud.

When there are a plurality of machine learning devices 300-1 to 300-$n$ corresponding to a plurality of control devices 200-1 to 200-$n$, respectively of the same type name, the same specification, or the same series, the plurality of machine learning devices 300-1 to 300-$n$ may be configured so that learning results in the machine learning devices 300-1 to 300-$n$ are shared. As a result, a more optimal model can be constructed.

EXPLANATION OF REFERENCE NUMERALS

10 Control system
100, 100-1 to 100-$n$ Machine tool
101 Spindle motor
102 Axis motor
105 Cycle counter
200, 200-1 to 200-$n$ Control device
210 Numerical control unit
220 Spindle control unit
230 Rotation detection unit
240 Axis motor control unit
300, 300-1 to 300-$n$ Machine learning device
301 State information acquisition unit
302 Learning unit
303 Action information output unit
304 Value function storage unit
305 Optimizing action information output unit
400 Network
500 Tapping program

What is claimed is:

1. A machine learning device that performs machine learning with respect to a control device of a machine tool, the control device controlling synchronous operation of a spindle motor and a feed axis motor,
the machine learning device comprising:
a first memory configured to store a first program; and
a first processor configured to execute the first program and control the machine learning device to:
cause the control device to execute a tapping program to acquire from the control device, state information including at least a torque command value with respect to the spindle motor, a drive state including deceleration of the spindle motor, and a ratio of a movement distance in acceleration and a movement distance in deceleration of the spindle motor;
output action information, including adjustment information of the ratio of the movement distance in acceleration and the movement distance in deceleration of the spindle motor included in the state information, to the control device;
output a reward value in reinforcement learning based on a torque command value in deceleration and a target torque command value in deceleration; and
update an action value function based on the reward value, the state information, and the action information.

2. The machine learning device according to claim 1, wherein the first processor is further configured to execute the first program and control the machine learning device to obtain a reward by a following Formula 1 by using a torque command value $T_m$ in deceleration, a target torque command value $T_t$ in deceleration, and a coefficient a.

$$a \times \left(1 - \frac{|Tt - Tm|}{Tt}\right).\quad\text{[Formula 1]}$$

3. The machine learning device according to claim 1, wherein the first processor is further configured to execute the first program and control the machine learning device to generate and output the ratio of the movement distance in acceleration and the movement distance in deceleration of the spindle motor, based on an updated value function.

4. A control system comprising the machine learning device according to claim 1, and the control device of the machine tool, the control device controlling synchronous operation of the spindle motor and the feed axis motor.

5. A control device, comprising the machine learning device according to claim 1, the control device controlling synchronous operation of the spindle motor and the feed axis motor.

6. The control system according to claim 4, wherein the control device comprises:
a second memory configured to store a second program; and
a second processor configured to execute the second program and control the control device to:
create a spindle command and a feed axis command based on the tapping program;
control rotation operation of the spindle motor according to the spindle command;
detect a rotation position of the spindle motor;
control feed operation of a feed axis based on the rotation position according to the feed axis command;
acquire a total rotation amount and a maximum rotation speed of the spindle motor from a start position to a target position, from the tapping program, the total rotation amount and the maximum rotation speed of the spindle motor being used as the spindle command;
cause the spindle motor to accelerate from the start position, by speed control with the maximum rotation speed of the spindle motor as a target value;
detect a rotation amount of the spindle motor based on the rotation position during the acceleration;
detect a remained rotation amount of the spindle motor from a current position to the target position based on the total rotation amount and the rotation position;
detect current speed of the spindle motor based on the rotation position; and
cause the spindle motor to decelerate and reach the target position by position control based on the ratio of the movement distance in acceleration and the movement distance in deceleration of the spindle motor, the remained rotation amount, and the current speed, after the acceleration.

7. The control device according to claim 5, wherein the control device comprises:
a second memory configured to store a second program; and
a second processor configured to execute the second program and control the control device to:
create a spindle command and a feed axis command based on the tapping program;
control rotation operation of the spindle motor according to the spindle command;
detect a rotation position of the spindle motor;
control feed operation of a feed axis based on the rotation position, according to the feed axis command;
acquire a total rotation amount and a maximum rotation speed of the spindle motor from a start position to a target position, from the tapping program, the total rotation amount and the maximum rotation speed of the spindle motor being used as the spindle command;
cause the spindle motor to accelerate from the start position by speed control with the maximum rotation speed of the spindle motor as a target value;
detect a rotation amount of the spindle motor based on the rotation position during the acceleration;
detect a remained rotation amount of the spindle motor from a current position to the target position based on the total rotation amount and the rotation position;
detect a current speed of the spindle motor based on the rotation position; and
cause the spindle motor to decelerate and reach the target position by position control based on the ratio of the movement distance in acceleration and the movement distance in deceleration of the spindle motor, the remained rotation amount, and the current speed, after the acceleration.

8. A machine learning method of a machine learning device that performs machine learning with respect to a control device of a machine tool, the control device controlling synchronous operation of a spindle motor and a feed axis motor,
the machine learning method comprising:
acquiring from the control device, state information including at least a torque command value with respect to the spindle motor, a drive state including deceleration of the spindle motor, and a ratio of a movement distance in acceleration and a movement distance in deceleration of the spindle motor, by causing the control device to execute a tapping program;
outputting action information, including adjustment information of the ratio of the movement distance in acceleration and the movement distance in deceleration of the spindle motor included in the state information, to the control device;
outputting a reward value in reinforcement learning based on a torque command value in deceleration and a target torque command value in deceleration; and
updating an action value function based on the reward value, the state information, and the action information.

\* \* \* \* \*